No. 641,527. Patented Jan. 16, 1900.
F. C. MEYER.
NEGATIVE HOLDER.
(Application filed May 28, 1897.)
(No Model.)
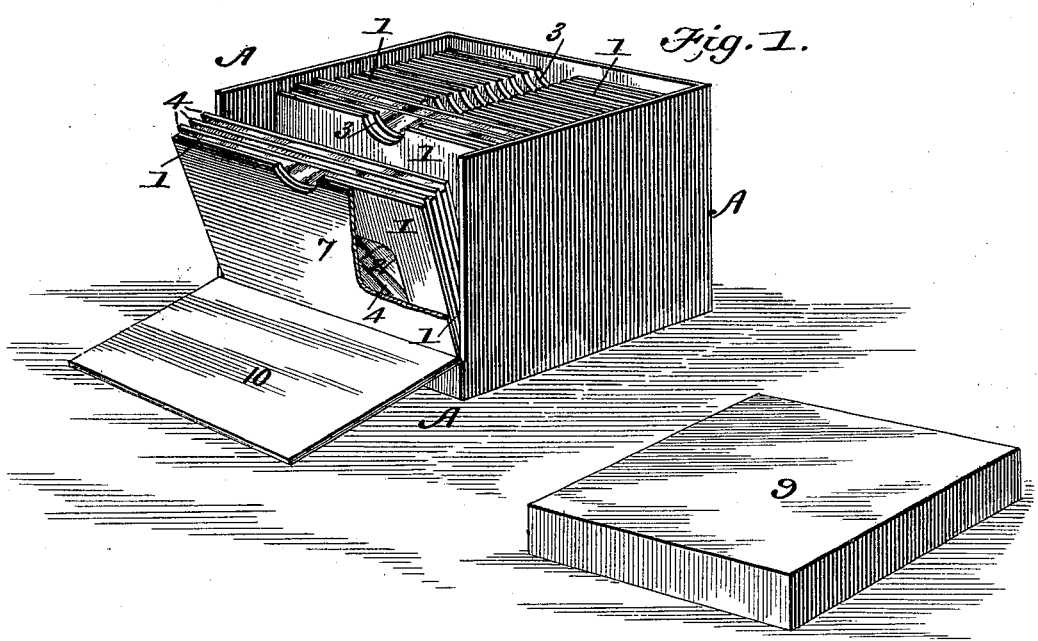
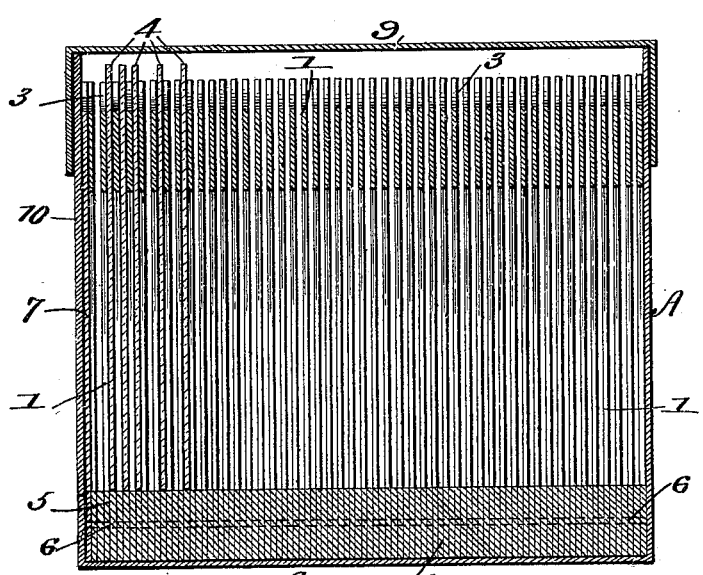
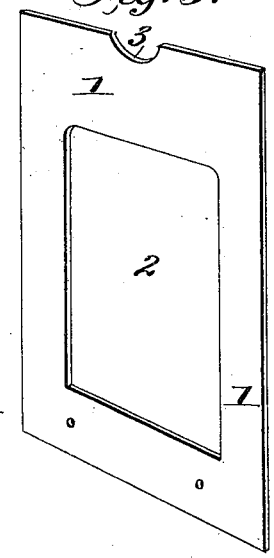
WITNESSES:
INVENTOR
Frank C. Meyer.
BY
ATTORNEYS.

UNITED STATES PATENT OFFICE.

FRANK C. MEYER, OF NEW YORK, N. Y.

NEGATIVE-HOLDER.

SPECIFICATION forming part of Letters Patent No. 641,527, dated January 16, 1900.

Application filed May 28, 1897. Serial No. 638,509. (No model.)

*To all whom it may concern:*

Be it known that I, FRANK C. MEYER, a citizen of the United States, residing in New York, (Brooklyn,) Kings county, State of New York, have invented a new and useful Improvement in Negative-Holders, of which the following is a specification.

My invention relates especially to devices employed for packing, storing, and preserving photographic negative-plates and articles of a similar description, and has for its object the provision of a simple, cheap, compact, and effective negative-holder.

To attain the desired end, my invention consists in certain novel and useful combinations or arrangements of parts and peculiarities of construction and operation, all of which will be hereinafter first fully described and then pointed out in the claims.

In the accompanying drawings, forming a part hereof, Figure 1 is a perspective view of my improved holder, the cover being removed and the front of the case or box being open and a portion of one of the flexible leaves cut out. Fig. 2 is a central vertical longitudinal section of the holder. Fig. 3 is a perspective view of one of the flexible leaves between which negatives are placed and held.

In its complete form my invention includes a negative-holder proper and a rectangular box or case A, into which such holder is fitted and secured, as shown in Figs. 1 and 2. The said box or case A has a removable cover 9 and a hinged foldable front 7, which is adapted to be thrown forward or dropped, as shown in Fig. 1.

The holder proper is constructed of the following parts: 1 indicates a series of flexible leaves, which are cut out centrally, as shown at 2. This construction prevents contact of the negatives 4 with each other when placed between the leaves and permits a circulation of air, which prevents molding of or adhesion between the leaves and negatives, so that the negatives are preserved from injury. The leaves 1 are separated at their bases by means of a series of pasteboard strips 5, which also form supports whereon the negatives 4 rest. The bottom edges of the leaves and strips are permanently secured together by means of transverse wires 6, Fig. 2, by glue, or any other means which will securely hold their bases together. The tops of the leaves are cut out at 3 to permit convenient introduction of negatives 4 between the leaves and their removal therefrom. The outer leaf 7 is made solid instead of being cut out like the others, and it is thus adapted for use for recording names or numbers of the negatives placed in the holder.

The entire negative-holder proper thus constructed is secured in the base of the box A, so that the whole forms a complete article ready for use and adapted for excluding dirt or dust, while protecting the plates during shipment or storage.

When it is desired to remove any negative, the box-cover 9 is lifted off and the tops of the leaves are drawn forward, as shown in Fig. 1, to expose and render easily accessible the particular negative desired.

What I claim is—

1. An improved holder proper for photographic negatives, which consists of a series of flexible leaves, and a series of strips 5, which are arranged between the base portions of said leaves, both said leaves and strips being secured solidly together, so that the strips form a solid base-support for the negatives, as shown and described.

2. The improved photograph negative-holder proper, consisting of a series of flexible, parallel leaves having their central portions cut out to allow circulation of air, a series of thick pasteboard strips 5 arranged between the bases of said leaves, and rods passing transversely through both leaves and strips and securing them permanently and firmly together, as shown and described.

3. The improved photograph negative-holder comprising the negative-holder proper, formed of a series of parallel flexible leaves, a series of interposed base-strips for spacing the leaves and supporting negatives, means for securing such leaves and strips together, and an inclosing rectangular box, or case, into which the negative-holder proper fits when it is permanently secured, said box having a hinged and folding front adapted to be turned outward to allow a single leaf or series of leaves to be bent outward, as and for the purpose specified.

FRANK C. MEYER.

Witnesses:
A. M. PIERCE,
C. A. PIERCE.